United States Patent
Yamamori et al.

(10) Patent No.: US 6,607,213 B2
(45) Date of Patent: *Aug. 19, 2003

(54) GAS GENERATING DEVICE FOR AIR BAG AND AIR BAG INFLATING METHOD

(75) Inventors: Kiyoshi Yamamori, Kanagawa (JP); Takuhiro Ono, Kanagawa (JP); Yoshikazu Kawauchi, Kanagawa (JP); Shigeru Takeyama, Kanagawa (JP); Norimasa Eto, Kanagawa (JP); Hiroyuki Takahashi, Kanagawa (JP); Yasushi Usui, Kanagawa (JP)

(73) Assignees: Matsushita Electric Industrial Co., Ltd., Kadoma (JP); Miyata Industry Co., Ltd., Chigasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/403,371
(22) PCT Filed: Apr. 24, 1998
(86) PCT No.: PCT/JP98/01896
§ 371 (c)(1),
(2), (4) Date: Oct. 21, 1999
(87) PCT Pub. No.: WO98/49034
PCT Pub. Date: Nov. 5, 1998

(65) Prior Publication Data
US 2002/0038948 A1 Apr. 4, 2002

(30) Foreign Application Priority Data
Apr. 25, 1997 (JP) .............................................. 9-109939

(51) Int. Cl.[7] .............................................. B60R 21/26
(52) U.S. Cl. ...................................... 280/736; 280/741
(58) Field of Search .............................. 280/734, 736, 280/737, 740, 741; 102/530, 531

(56) References Cited
U.S. PATENT DOCUMENTS
5,219,178 A * 6/1993 Kobari et al. ................ 280/736
(List continued on next page.)

FOREIGN PATENT DOCUMENTS
EP 602 862 A1 * 6/1994
(List continued on next page.)

OTHER PUBLICATIONS
"Inflator Assembly for an Inflatable Vehicle Occupant Protection Device Having Tallorable Output" Research Disclosure, Hampshire, GB, No. 380, Dec. 1, 1995, pp. 827–829, XP000549841 ISSN: 0374–4353.

Primary Examiner—Brian L. Johnson
Assistant Examiner—Christopher Bottorff
(74) Attorney, Agent, or Firm—Armstrong, Westerman & Hattori, LLP

(57) ABSTRACT

The present invention relates to a gas generator for an air bag apparatus mounted in a vehicle or the like for protecting an occupant in the vehicle by charging gas into the air bag interposed between the occupant and a vehicle member at the time of collision of the vehicle. The gas generator for the air bag of the present invention comprises a first chamber (9) accommodating a flammable fluid (7) having a first vent opening (8) which is in communication with the air bag (3), a second chamber (5) accommodating the flammable fluid (7) and having a volume greater than that of the first chamber (9), a first occluding member (31) for occluding the first vent opening (8), and an ignition device (14) for igniting the flammable fluid (7) in the first chamber (9). By burning at least a portion of the flammable fluid (7) in the first chamber (9), the fluid in the first chamber (9) and the second chamber (5) is discharged out through the first vent opening (8), thereby inflating the air bag (3). Therefore, since the first occluding member is swiftly destroyed and burnt fluid mixture in the first chamber is discharged, it is possible to shorten the initial responding time at which the air bag starts inflating.

9 Claims, 8 Drawing Sheets

U.S. PATENT DOCUMENTS

| | | | |
|---|---|---|---|
| 5,263,740 A | * 11/1993 | Frey et al. | 280/737 |
| 5,280,951 A | * 1/1994 | Rizzi et al. | 280/736 |
| 5,464,247 A | * 11/1995 | Rizzi et al. | 280/737 |
| 5,564,743 A | * 10/1996 | Marchant | 280/736 |
| 5,582,428 A | * 12/1996 | Buchanan et al. | 280/736 |
| 5,664,802 A | * 9/1997 | Harris et al. | 280/736 |
| 5,683,107 A | 11/1997 | Headley et al. | 280/741 |
| 5,709,406 A | * 1/1998 | Buchanan | 280/736 |
| 5,743,557 A | * 4/1998 | Butt | 280/740 |
| 5,794,973 A | * 8/1998 | O'Loughlin et al. | 280/737 |
| 5,799,973 A | * 9/1998 | Bauer et al. | 280/736 |
| 5,803,493 A | * 9/1998 | Paxton et al. | 280/737 |
| 5,803,494 A | * 9/1998 | Headley | 280/736 |
| 5,857,699 A | * 1/1999 | Rink et al. | 280/737 |
| 5,863,066 A | * 1/1999 | Blumenthal | 280/740 |
| 6,089,598 A | * 7/2000 | Snyder et al. | 280/740 |

FOREIGN PATENT DOCUMENTS

| | | |
|---|---|---|
| EP | 0 658 460 A | 6/1995 |
| EP | 0 816 185 A | 1/1998 |
| JP | 49-49340 | 5/1974 |
| JP | 4-135943 | 5/1992 |
| JP | 5-278554 | 10/1993 |
| JP | 6-144147 | 5/1994 |
| JP | 7-505844 | 6/1995 |

* cited by examiner

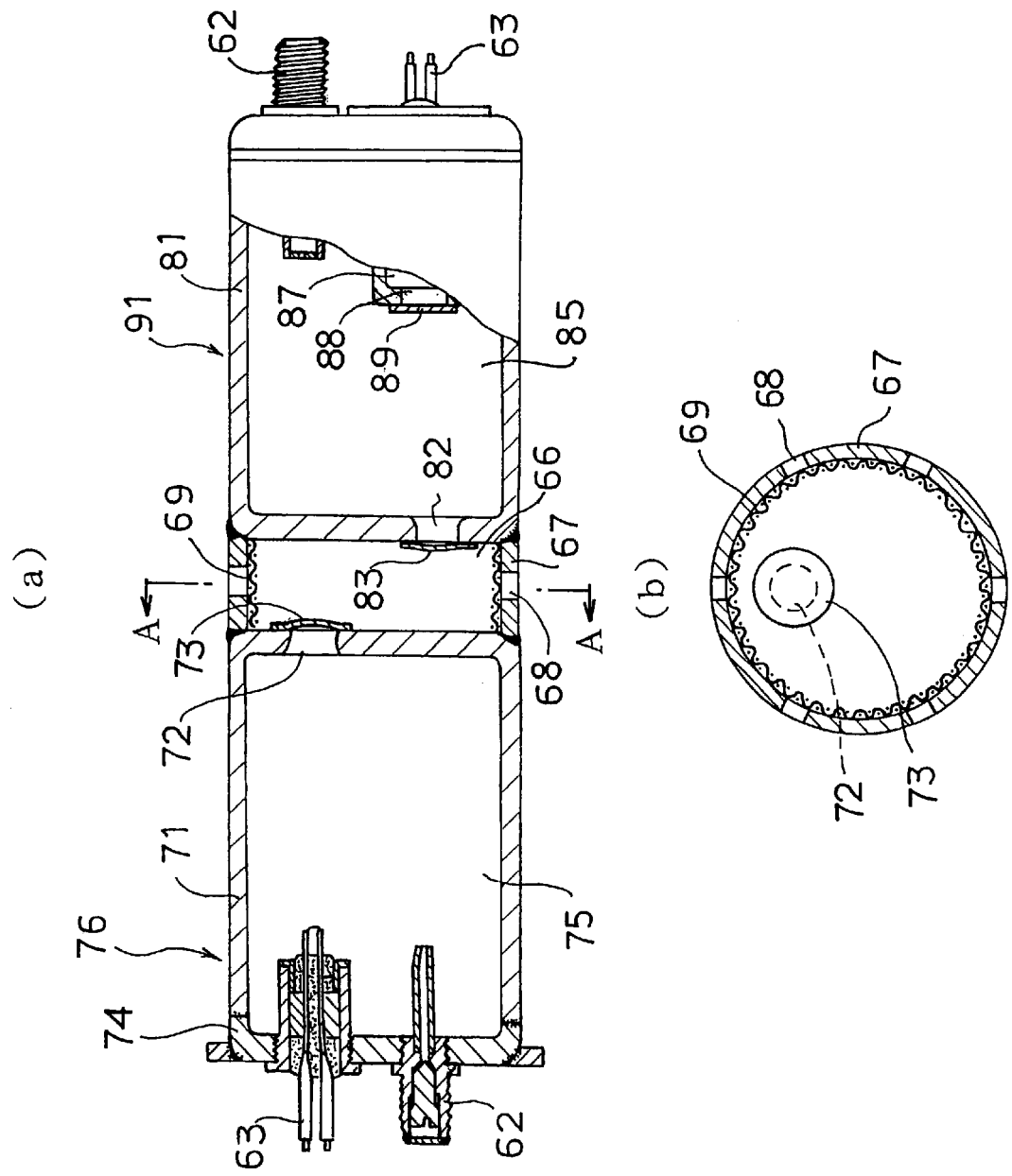

GAS GENERATING DEVICE FOR AIR BAG AND AIR BAG INFLATING METHOD

TECHNICAL FIELD

The present invention relates to a gas generator for an air bag apparatus mounted in a vehicle or the like for protecting an occupant therein by inflating the air bag between the occupant and a constituent member of the vehicle at the time of collision of the vehicle, and the present invention also relates to an inflating method of the air bag.

BACKGROUND TECHNIQUE

A conventional air bag apparatus comprises a gas generator and an activate signal generating circuit for judging a degree of a collision detected by a collision sensor to activate an activating apparatus of the gas generator. As such a gas generator, there exist a solid propellant burning type gas generator, an inert gas accumulating type gas generator, an accumulating flammable gas burning type gas generator, and a hybrid type gas generator comprising the solid propellant burning type gas generator and the accumulating flammable gas burning type gas generator.

At the time of collision of the vehicle, if the activate signal is applied to the activating apparatus of the gas generator, an ignition section which is a part of the activating apparatus is heated, and when the ignition section is a squib, priming is exploded by the squib, and gunpowder charged in the vicinity of the priming is ignited.

In the case of the solid propellant burning type gas generator, a gas generating agent is ignited by thermal energy generated at that time, and the gas generating agent is burnt at a previously designed speed to generate burnt gas.

In the case of the inert gas accumulating type gas generator, a sealing plate of an accumulated gas vessel is similarly opened by explosion pressure of a trigger device, and the gas is generated at a previously designed speed.

In the case of each of the accumulating flammable gas burning type gas generator and the hybrid type gas generator, the accumulated gas itself is burnt by a trigger device or an ignition merely having a heating portion, and the burnt gas is generated at a previously designed speed.

Usually, timing for generating the activate signal is previously programmed such that the signal is generated when the vehicle collides against an obstruction such as a wall at a normal running speed (25 to 60 km/h). In this case, this timing is programmed on condition that an occupant having a predetermined weight, height and the like sits on a predetermined sitting position. Further, in any of the gas generators, the air bag apparatus is designed such that the air bag is inflated and developed within a short time such as about 40 to 50 ms so that it is possible to prevent the occupant from crashing into a steering wheel or a dashboard and from being damaged physically.

However, in any of the above-described conventional air bag apparatuses, since the inflating manner of the air bag is constant, when the sitting position and the physical condition are different from the predetermined condition, especially when the occupant is a child or a low occupant, it is reported lately that so far from protecting the occupant, the air bag may damage the occupant. Therefore, it is desirable to realize an air bag apparatus capable of controlling the inflation characteristics of the air bag in accordance with various conditions such as a physical condition and a sitting position of the occupant, a vehicle speed and the like.

The present invention has been accomplished to solve such a conventional problem, and it is an object of the invention to provide an accumulating flammable gas burning type gas generator for an air bag apparatus capable of controlling an amount of flammable gas, injection timing of flammable gas and the like.

DISCLOSURE OF THE INVENTION

According to a first aspect of the present invention, there is provided a gas generator for an air bag apparatus comprising charging means which is sealed after a flammable fluid is charged, a first chamber accommodating the charged flammable fluid and having a first vent opening occluded by a first occluding member, a second chamber accommodating a flammable fluid and having a volume greater than that of the first chamber and having a second vent opening occluded by a second occluding member which is capable of being in communication with the first chamber, at least one communication hole formed in a portion of a wall forming the first chamber and bringing the first and second chambers into communication with each other, first ignition means for igniting the flammable fluid in the first chamber, second ignition means for igniting the flammable fluid in the second chamber, and a diffuser which can be in communication with the first chamber through the first vent opening. By combining the ignition timings of the plurality of ignition means to control the injection speed of the burnt gas, it is possible to inflate and develop the air bag optimally so as to meet various conditions.

According to a second aspect of the invention, there is provided a gas generator for an air bag apparatus comprising charging means which is sealed after a flammable fluid is charged, a single chamber accommodating the charged flammable fluid and having a vent opening occluded by an occluding member, first and second ignition means for igniting the flammable fluid at different positions, an ignition preliminary chamber formed such as to surround the first ignition means and having at least one communication hole which is in communication with the single chamber, and a diffuser which can be in communication with the single chamber through the vent opening. By combining the ignition timings of the plurality of ignition means to control the injection speed of the burnt gas, it is possible to inflate and develop the air bag optimally so as to meet various conditions.

According to a third aspect of the invention, the gas generator further comprises an ignition preliminary chamber formed such as to surround the second ignition means and having at least one communication hole which is in communication with the second chamber. In addition to the first aspect, it is possible to swiftly burn the flammable fluid by the ignition preliminary chamber.

According to a fourth aspect of the invention, the gas generator further comprises an ignition preliminary chamber formed such as to surround the second ignition means and having at least one communication hole which is in communication with the single chamber. In addition to the second aspect, it is possible to swiftly burn the flammable fluid by the ignition preliminary chamber.

According to a fifth aspect of the invention, there is provided a gas generator for an air bag apparatus comprising first gas generating means, a second gas generating means and a diffuser, wherein each of the first and second gas generating means comprises charging means which is sealed after a flammable fluid is charged, a single chamber accommodating the charged flammable fluid and having a vent opening occluded by an occluding member, and ignition means for igniting the flammable fluid in the single chamber, wherein the diffuser is capable of being in communication with the single chambers through the vent openings respectively. Accommodating volumes and charging pressure of gases of the two gas generating means and gas components are set equal to or different from each other, and activating timings of the two ignition means are combined so as to control the injection amount, the injection speed and the like of the burnt gas, it is possible to inflate and develop the air bag optimally so as to meet various conditions.

According to a sixth aspect of the invention, there is provided a gas generator for an air bag apparatus comprising first gas generating means, a second gas generating means and a diffuser, wherein each of the first and second gas generating means comprises charging means which is sealed after a flammable fluid is charged, a single chamber accommodating the charged flammable fluid and having a vent opening occluded by an occluding member, ignition means for igniting the flammable fluid in the single chamber, and an ignition preliminary chamber formed such as to surround the ignition means and having at least one communication hole which is in communication with the single chamber, wherein the diffuser is capable of being in communication with the single chambers through the vent openings respectively. Accommodating volumes and charging pressure of gases of the two gas generating means and gas components are set equal to or different from each other, and activating timings of the two ignition means are combined so as to control the injection amount, the injection speed and the like of the burnt gas, it is possible to inflate and develop the air bag optimally so as to meet various conditions.

According to a seventh aspect of the invention, there is provided a gas generator for an air bag apparatus comprising first gas generating means, a second gas generating means and a diffuser, wherein each of the first and second gas generating means comprises charging means which is sealed after a flammable fluid is charged, a single chamber accommodating the charged flammable fluid and having a vent opening occluded by an occluding member, and ignition means for igniting the flammable fluid in the single chamber, wherein the second gas generating means comprises an ignition preliminary chamber formed such as to surround the ignition means and having at least one communication hole which is in communication with the single chamber, and the diffuser is capable of being in communication with the single chambers through the vent openings respectively. Accommodating volumes and charging pressure of gases of the two gas generating means and gas components are set equal to or different from each other, and activating timings of the two ignition means are combined so as to control the injection amount, the injection speed and the like of the burnt gas, it is possible to inflate and develop the air bag optimally so as to meet various conditions.

According to an eighth aspect of the invention, volumes of the single chambers of the first and second gas generating means, gas pressure of the flammable fluids charged in said single chambers of the first and second gas generating means, or gas components of the flammable fluids charged in said single chambers of the first and second gas generating means are substantially the same. By controlling the volume of the vessel, the pressure of the flammable fluid and the composition of the flammable fluid, it is possible to control the injection amount and the injection speed of the burnt gas.

According to a ninth aspect of the invention, volumes of the single chambers of the first and second gas generating means, gas pressure of the flammable fluids charged in said single chambers of the first and second gas generating means, or gas components of the flammable fluids charged in said single chambers of the first and second gas generating means are substantially different from each other.

According to a tenth aspect of the invention, the flammable fluid includes fuel gas, oxdizer gas and inert gas. Therefore, it is possible to use a flammable fluid which is easily available.

According to an eleventh aspect of the invention, only one of the ignition means is allowed to ignite. By igniting only one of the ignition means, it is possible to control the injection amount, the injection speed and the like of the burnt gas, and it is possible to inflate and develop the air bag optimally so as to meet various conditions.

According to a twelfth aspect of the invention, ignition timings of the two ignition means are different from each other. By controlling the ignition timing, it is possible to control the injection amount, the injection speed and the like of the burnt gas, and it is possible to inflate and develop the air bag optimally so as to meet various conditions.

According to a thirteenth aspect of the invention, ignition timings of the two ignition means are the same. By controlling the ignition timing, it is possible to control the injection amount, the injection speed and the like of the burnt gas, and it is possible to inflate and develop the air bag optimally so as to meet various conditions.

According to a fourteenth aspect of the invention, there is provided an inflating method of an air bag using the gas generator described in any one of claims 1, 2, and 5 to 7. By controlling the ignition timing, it is possible to control the injection amount, the injection speed and the like of the burnt gas, and it is possible to inflate and develop the air bag optimally so as to meet various conditions.

BRIEF DESCRIPTION OF THE DRAWINGS

FIG. 8(a) is a partial sectional view of a gas generator for an air bag apparatus according to an eighth embodiment of the invention; and FIG. 8(b) is a transverse sectional view taken along the line A—A in FIG. 8(a).

BEST MODE FOR CARRYING OUT THE INVENTION

First Embodiment

Figure 1:
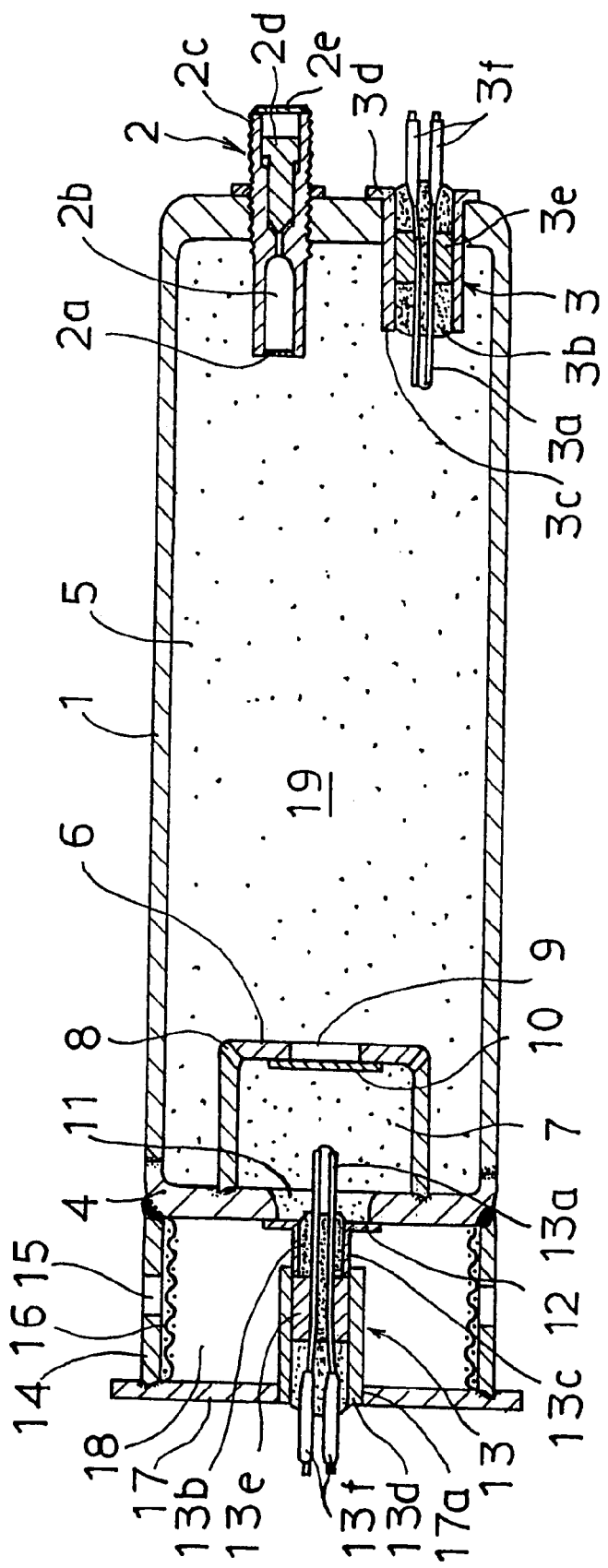
FIG. 1 is a sectional view of a gas generator for an air bag apparatus according to a first embodiment of the present invention.

FIG. 1 shows a structure of a gas generator for an air bag apparatus according to a first embodiment of the present invention. In FIG. 1, a first bottomed cylindrical vessel member 1 has an occluded bottom to which charging means 2 and second ignition means 3 are mounted. The charging means 2 has a plate 2a provided at its tip end with a small hole. A plug member 2c having an ignition preventing chamber 2b therein is screwed into a first vessel member 1 and the screwed portion is hermetically welded. A flammable gas 19 such as hydrogen gas and a mixture gas of oxygen and inert gas are charged into the charging means 2. Then, the inside of the charging means 2 is temporarily sealed by a sealing screw 2d, and a sealing plate 2e is hermetically welded to the plug member 2c. The second ignition means 3 includes an ignition unit in which an ignition electrode 3a having a filament welded between two electrodes is fixed by a ceramic insulator 3b and held in a flanged metal case 3c. In the second ignition means 3, the ignition unit is inserted into the cylindrical member 3d and hermetically sealed, and the cylindrical member 3d and the flange of the metal case 3c are hermetically welded, a noise current deleting ferrite bead 3e is inserted into a space of the cylindrical member 3d, and connected portions between the ignition electrode 3a and lead wires 3f are fixed to each other by sealing resin. The cylindrical member 3d is screwed into the first vessel member 1 and then is hermetically welded, and an activate signal generating circuit (not shown) is connected to the lead wires 3f.

A lid member 4 is welded to an opened end of the first vessel member 1, and a space in the first vessel member 1 is formed as a second chamber 5. An opened end of a small bottomed cylindrical second vessel member 6 is previously welded to an inner side of the lid member 4, and a space in the second vessel member 6 is formed as a first chamber 7. The second vessel member 6 is formed at its wall surface with at least one communication hole 8 having a size through which flame can pass. The second vessel member is formed at its bottom with a second vent opening 9. After this gas generator has been assembled, component gas charged into the second chamber 5 from the charging means 2 is also charged into the first chamber 7 through the communication hole 8. The component gas charged in nonuniform state is then stirred by dispersion and becomes uniform flammable gas 19. A disk-like second occluding member 10 is welded to an inner side of the second vent opening 9. The lid member 4 is formed at its wall surface opposed to the second vent opening 9 with a first vent opening 11, and a first occluding member 12 for occluding the first vent opening 11 is hermetically welded to an outer side of the lid member 4.

The first occluding member 12 is integrally formed with both a ceramic insulator 13b holding an ignition electrode 13a of first ignition means 13 and a metal case 13c which is hermetically sealed, and both of them constitute an ignition unit. An outer periphery of a flange of the metal case 13c which is the first occluding member 12 is hermetically welded to the lid member 4 such as to occlude the second vent opening 11. A cylindrical member 14 is also welded to the lid member 4, and a peripheral wall surface of the cylindrical member 14 is formed with a plurality of gas injection ports 15. A metal mesh 16 is disposed along an inner peripheral surface of the cylindrical member 14 and then, a lid member 17 having a mounting hole 17a for mounting the first ignition member 13 is welded to the cylindrical member 14, and a diffuser 18 is formed. Then, the cylindrical member 13d of the first ignition means 13 is welded to the mounting hole 17a, a ferrite bead 13e is inserted to the cylindrical member 13d, and connected portions between the ignition electrode 13a and lead wires 13f are fixed to each other by sealing resin. The lead wires 13f are connected to an activate signal generating circuit (not shown) like in the second ignition means 3. The first vent opening 11 and the first occluding member 12 may be provided separately from the first ignition means 13.

The operation of the present embodiment will be explained next. When an acceleration detecting circuit (not shown) detects abrupt deceleration, a judgment circuit judges whether the abrupt deceleration is caused by collision, and by its signal, an activate signal is generated from the activate signal generating circuit, the filament of the ignition electrode 13a of the first ignition means 13 is heated, the flammable gas 19 in the first chamber 7 ignites and starts burning. By the temperature rise due to this burning, a pressure in the first chamber 7 is increased, and when the pressure exceeds a valve-opening set pressure of the first occluding member 12, the first occluding member 12 is destroyed, the burnt gas in the first chamber 7 is dispersed in the diffuser 18 through the first vent opening 11, and is introduced into the air bag (not shown) from the gas injection ports 15 of the diffuser 18, thereby inflating the air bag.

On the other hand, when an internal pressure of the first chamber 7 is increased by the burning of the flammable gas 19 therein, the burnt gas flows into the second chamber 5 through the communication hole 8, and the flammable gas 19 in the second chamber 5 is ignited and starts burning. The pressure rise in the second chamber 5 by this burning and the pressure drop in the first chamber 7 by the destruction of the first occluding member 12 destroy the second occluding member 10, the burnt gas in the second chamber 5 flows into the diffuser 18 through the second vent opening 9 and the first vent opening 11, and the burnt gas is introduced into the air bag from the gas injection ports 15 of the diffuser 18.

The above is the operation mode when the second ignition means 3 of the gas generator is not activated, and this operation mode is called a first single ignition mode here. In the present embodiment, it is possible to obtain five kinds of operation modes, i.e., one simultaneous ignition mode, two time-lag ignition modes, and two single ignition modes, by controlling the ignition timing of each of the first and second ignition means 13 and 3.

In the simultaneous ignition mode, when the vehicle collides during high speed driving at a speed of 60 km/h or higher for example, since the air bag must inflate instantaneously, both the first and second ignition means 13 and 3 are activated simultaneously. With this operation, the flammable gases in the first and second chambers 7 and 5 start burning simultaneously, and the second occluding member 10 is also destroyed immediately after the first occluding member 12 is destroyed. Therefore, the burnt gas can be introduced into the air bag swiftly.

In a first time-lag ignition mode, after the first ignition means 13 is activated, the second ignition means 3 is activated. In a first single ignition mode where only the first ignition means 13 is activated, the flammable gas in the second chamber 5 at the side of the first chamber 7 first starts burning by the burnt gas flowing into the second chamber 5 from the communication hole 8, and the burnt gas is gradually propagated toward the other side, and the pressure is gradually increased. Therefore, by activating the second ignition means 3 after the first ignition means 13 is activated, it is possible to speed up the burning of the flammable gas in the second chamber 5, and it is possible to destroy the second occluding member 10 within shorter time correspondingly. Therefore, the air bag can be inflated swiftly, although the inflating speed is slower than the simultaneous ignition mode.

In the second time-lag ignition mode, the first ignition means 13 is activated after the second ignition means 3 is activated. The second time-lag ignition mode is opposite from the first time-lag ignition mode. In the second time-lag ignition mode, the flammable gas 19 in the second chamber 5 is ignited and burnt by the second ignition means 3, the burnt gas is propagated toward the first chamber 7, the first ignition means 13 is activated to burn the flammable gas in the first chamber 7, and the flammable gas in the second chamber 5 is ignited by the burnt gas through the communication hole 9. In this mode, it is possible to inflate the air bag slower than that in the first time-lag ignition mode.

In the second single ignition mode, the first ignition means 13 is not activated, and only the second ignition means 3 is activated. As described above, the second occluding member 10 is destroyed by the pressure rise in the second chamber 5 due to the burnt gas in the second chamber 7 due to destruction of the first occluding member 12 by the burnt gas in the first chamber 7. Therefore, if the first ignition means 13 is not activated, the pressure drop in the first chamber 7 is not generated, and it is necessary to wait for the pressure rise by the burnt gas in the second chamber 5 correspondingly and thus, it is possible to inflate the air bag at the slowest speed.

By selecting these operation modes using the computer circuit in accordance with the preset program based on the signals from the sensors which detect the degree of the collision, the sitting position, the physical conditions and the like, it is possible to inflate the air bag under the optimal condition.

As described above, according to the present embodiment, since the first chamber 7 includes the first ignition means 13 and the second chamber 5 includes the second ignition means 3, it is possible to control the injection speed of the burnt gas by controlling the ignition timing of these ignition means, and it is possible to realize a gas generator for an air bag apparatus which meets various conditions.

Second Embodiment

Figure 2:
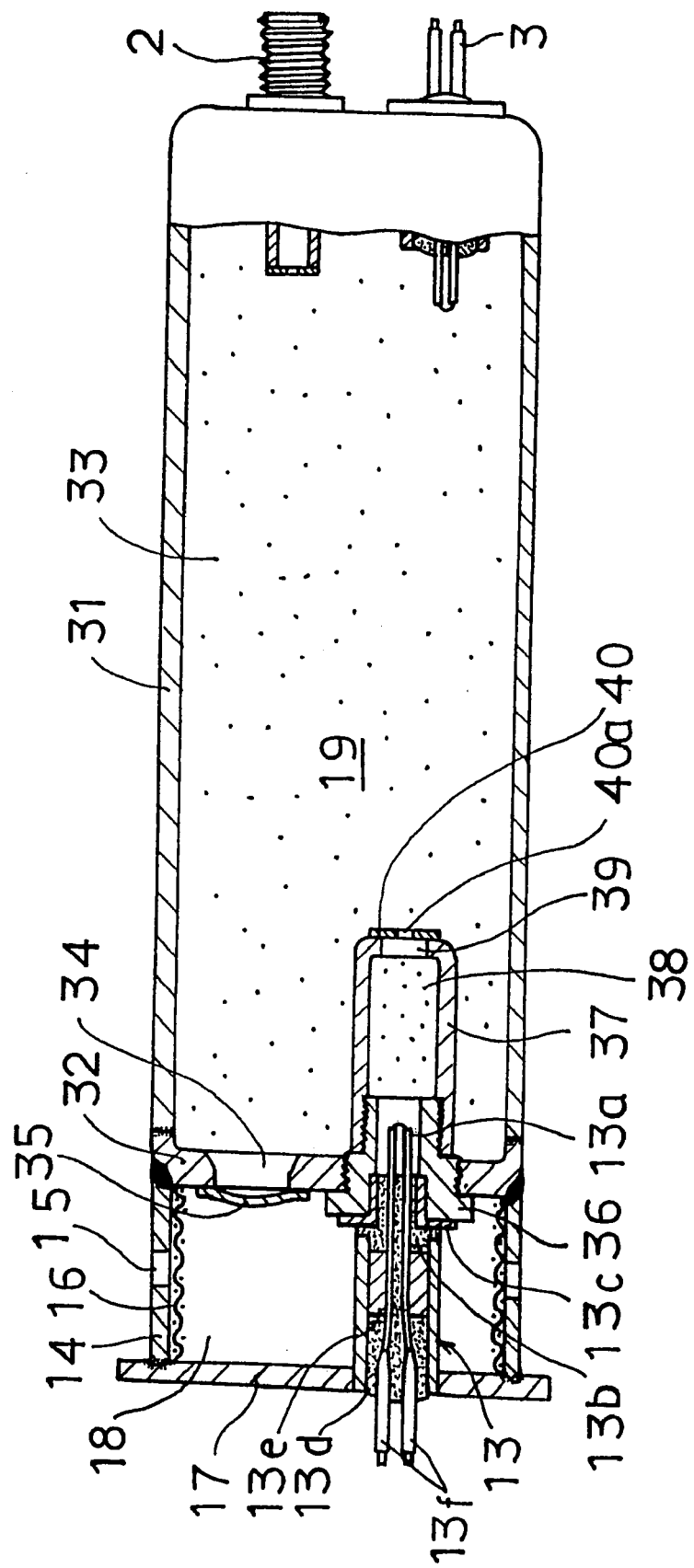
FIG. 2 is a partial sectional view of a gas generator for an air bag apparatus according to a second embodiment of the invention.

FIG. 2 shows a structure of a gas generator for an air bag apparatus according to a second embodiment of the present invention. The same elements as those in the first embodiment are designated by the same reference symbols. A first bottomed cylindrical vessel member 31 has an occluded bottom to which charging means 2 and second ignition means 3 are mounted. A lid member 32 is welded to an opened end of the first vessel member 31, and a space in the first vessel member 31 is formed as a single chamber 33. The lid member 32 is formed with a vent opening 34, and an occluding member 35 is welded to an outer side of the vent opening 34. A holding member 36 having a through hole is fixed to the lid member 32, and an opened end of a second vessel member 37 which is a small bottomed cylindrical member is fixed to an end of the holding member 36 closer to the single chamber 33. A space in the second vessel member 37 is formed as an ignition preliminary chamber 38. An occluded bottom of the second vessel member 37 is formed with an opening 39, and a sealing plate 40 having a communication hole 40 occludes the opening 39. This sealing plate 40 is for reliably burning the gas in the ignition preliminary chamber 38, and has a roll as a safety valve. The sealing plate 40 is not necessary to be provided, and the communication hole 40a may directly be provided in the occluded bottom of the second vessel member 37. After the gas generator has been assembled, a predetermined amount of hydrogen gas is first charged into the single chamber 33 from the charging means 2 as in the first embodiment, but the hydrogen gas is also charged into the ignition preliminary chamber 38 through the communication hole 40a at the same time. Next, a predetermined amount of mixture gas of oxygen gas and inert gas is charged into the single chamber 33. In this case, the hydrogen gas is pushed by the mixture gas which was charged later and the hydrogen gas is unevenly distributed in the ignition preliminary chamber 38 at a high concentration. After the charging of the gases, the gases in the two chambers are dispersed through the communication hole 40a and uniformed.

A first ignition means 13 is welded to the other end of the holding member 36, and an ignition electrode 13a whose filament is welded between tip ends of the first ignition means 13 is directed toward the ignition preliminary chamber 38. A ceramic insulator 13b holding the ignition electrode 13a and a metal case 13c holding the ceramic insulator 13b of the first ignition means 13 are hermetically sealed to the holding member 36, and a flange of the metal case 13c is hermetically welded to the holding member 36. A cylindrical member 14 is welded to the lid member 32, and a plurality of gas injection ports 15 are formed in a peripheral wall surface of the cylindrical member 14. A metal mesh 16 is disposed along an inner peripheral surface of the cylindrical member 14 and then, a lid member 17 is welded to form a diffuser 18. A ferrite bead 13e is inserted to the cylindrical member 13d mounted to a ceiling of the lid member 17 directly above the first ignition means 13, and connected portions between the ignition electrode 13a and lead wires 13f are fixed by sealing resin. Like the second ignition means 3, the lead wires 13f are connected to an activate signal generating circuit (not shown).

The operation of the present embodiment will be explained next. When an acceleration detecting circuit (not shown) detects abrupt deceleration, i.e., collision or the like of the vehicle, the filament of the ignition electrode 13a of the first ignition means 13 is heated by a signal from the acceleration detecting circuit as in the previous embodiment, and the flammable gas 19 in the ignition preliminary chamber 28 is ignited and starts burning. Since the ignition preliminary chamber 38 is small in volume, a pressure therein is immediately increased so that burnt gas is injected into the single chamber 33 from the communication hole 40a, and flammable gas 19 in the single chamber 33 is ignited. If the pressure in the single chamber 33 exceeds a valve-opening setting pressure of the occluding member 35, the occluding member 35 is destroyed, the burnt gas in the single chamber 33 is dispersed in the diffuser 18 through the vent opening 34, and the burnt gas is introduced into the air bag (not shown) from the gas injection ports 15, thereby inflating the air bag.

The above is the operation mode when the second ignition means of the gas generator is not activated. In the present embodiment also, one simultaneous ignition mode, two time-lag ignition modes and two single ignition modes can be obtained by controlling the ignition timing of each of the first and second ignition means 13 and 3 as in the previous first embodiment.

Third Embodiment

Figure 3:
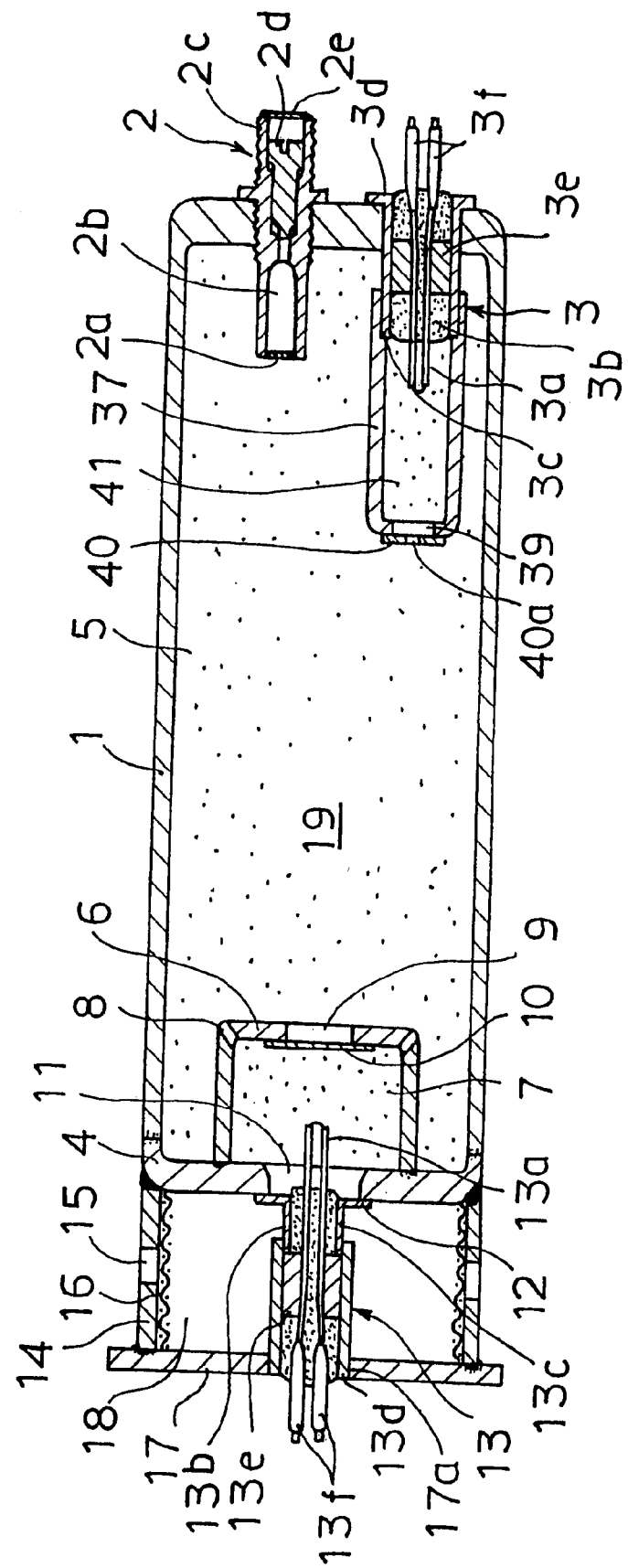
FIG. 3 is a sectional view of a gas generator for an air bag apparatus according to a third embodiment of the invention.

FIG. 3 shows a structure of a gas generator for an air bag apparatus according to a third embodiment of the present invention. In the third embodiment, the ignition preliminary chamber 38 of the second embodiment and a similar ignition preliminary chamber 41 are provided in the second ignition means 3 of the first embodiment. Since other portions have the same structures as those in the first embodiment, the same elements as those in the first embodiment are designated by the same reference symbols, and their descriptions will be omitted.

In the third embodiment, in addition to the effect in the first embodiment, it is possible to speed up the ignition and burning of the flammable gas by the second ignition means 3 having the ignition preliminary chamber 41.

Fourth Embodiment

Figure 4:
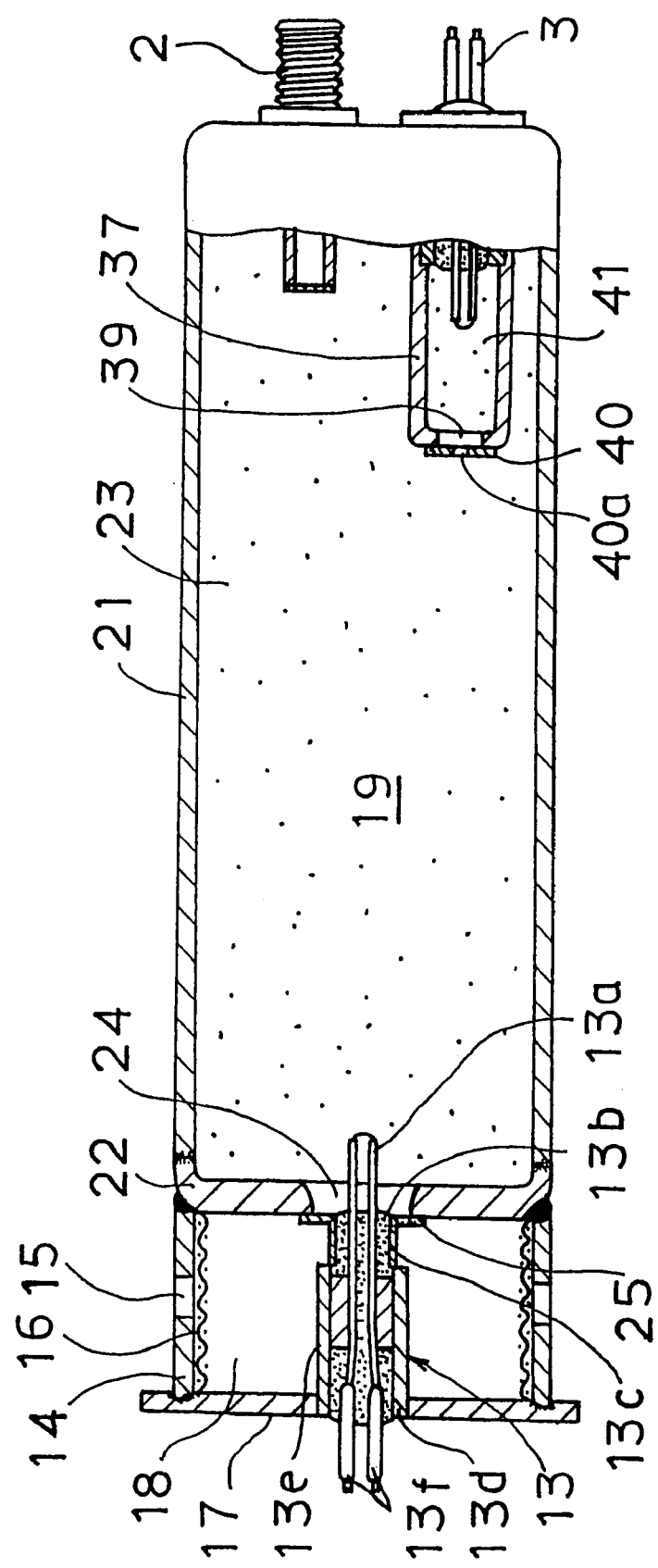
FIG. 4 is a partial sectional view of a gas generator for an air bag apparatus according to a fourth embodiment of the invention.

FIG. 4 shows a structure of a gas generator for an air bag apparatus according to a fourth embodiment of the present invention. The same elements as those in the first embodiment are designated by the same reference symbols. Charging means 2 and second ignition means 3 are mounted to an occluded bottom of a bottomed cylindrical vessel member 21. A lid member 22 is welded to an opened end of the vessel member 21, and a space in the vessel member 21 is formed as a single chamber 23. The lid member 22 is formed at its central portion with a vent opening 24, and an occluding member 25 is welded to an outer side of the lid member 22. The occluding member 25 is integrally formed with both a ceramic insulator 13b holding an ignition electrode 13a of a first ignition means 13 and a metal case 13c which is hermetically sealed. Both the ceramic insulator 13b and the metal case constituted an ignition unit, and an outer periphery of a flange of the metal case 13c which is the occluding member 25 is hermetically welded to the lid member 22 such as to occlude the vent opening 24. A cylindrical member 14 is welded to the lid member 22, and the cylindrical member 14 is formed at its peripheral wall surface with a plurality of gas injection ports 15. A metal mesh 16 is disposed along an inner peripheral surface of the cylindrical member 14 and then, the lid member 17 is welded to the cylindrical member 14 to form a diffuser 18. Then, a cylindrical member 13d of the first ignition means 13 is welded to the lid member 17, a ferrite bead 13e is inserted to the cylindrical member 13d, and connected portions of the ignition electrode 13a and lead wires 13f are fixed by sealing resin. The lead wires 13f are connected to an activate signal generating circuit (not shown) like the second ignition 3. The vent opening 11 and the first occluding member 12 may be provided separately from the first ignition means 13. In the present embodiment, the ignition preliminary chamber 38 of the third embodiment and a similar ignition preliminary chamber 41 are provided in the second ignition means 3.

The operation of the present embodiment will be explained next. When an acceleration detecting circuit (not shown) detects abrupt deceleration, i.e., collision or the like or the like of the vehicle, the filament of the ignition electrode 13a of the first ignition means 13 is heated by a signal from the acceleration detecting circuit as in the previous embodiment, and the flammable gas in the single chamber 23 is ignited and starts burning. A pressure in the single chamber 23 is increased by the temperature rise due to the burning, and when the pressure exceeds a valve-opening set pressure of the occluding member 25, the occluding member 25 is destroyed, the burnt gas in the single chamber 23 is dispersed in the diffuser 18 through the vent opening 24, and is introduced into the air bag (not shown) from the gas injection ports 15 of the diffuser 18, thereby inflating the air bag.

The above is the operation mode when the second ignition means 3 of the gas generator is not activated. In the present embodiment also, one simultaneous ignition mode, two time-lag ignition modes and two single ignition modes can be obtained by controlling the ignition timing of each of the first and second ignition means 13 and 3 as in the previous first embodiment.

The fourth embodiment has an effect that it is possible to speed up the ignition and burning of the flammable gas by the second ignition means 3 having the ignition preliminary chamber 41.

Fifth Embodiment

Figure 5:
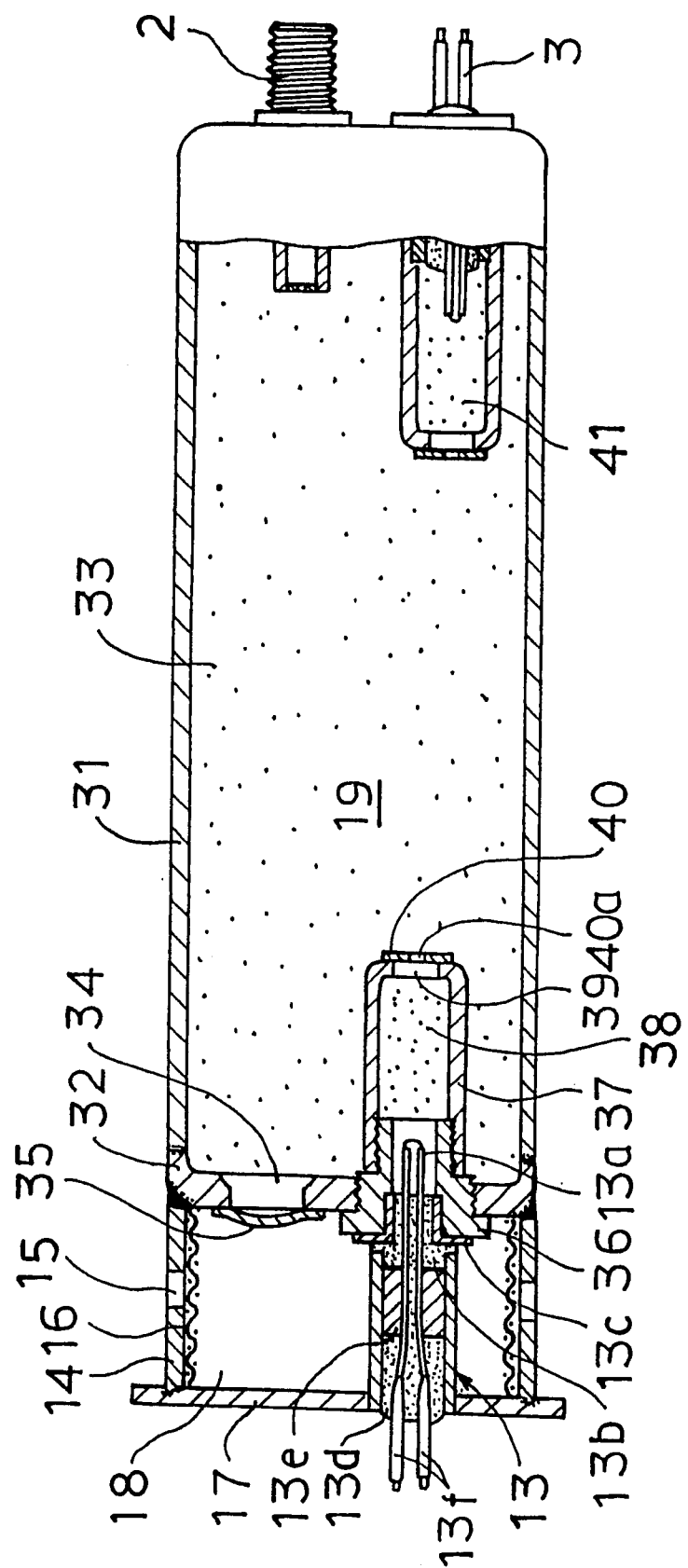
FIG. 5 is a partial sectional view of a gas generator for an air bag apparatus according to a fifth embodiment of the invention.

FIG. 5 shows a structure of a gas generator for an air bag apparatus according to a fifth embodiment of the present invention. In the fifth embodiment, the ignition preliminary chamber 38 of the third embodiment and a similar ignition preliminary chamber 41 are provided in the second ignition means 3 of the previous embodiment. Since other portions have the same structures as those in the third embodiment, the same elements as those in the third embodiment are designated by the same reference symbols, and their descriptions will be omitted.

In the present embodiment, in addition to the effect in the second embodiment, it is possible to speed up the ignition and burning of the flammable gas by the second ignition means 3 having the ignition preliminary chamber 41.

Sixth Embodiment

Figure 6:
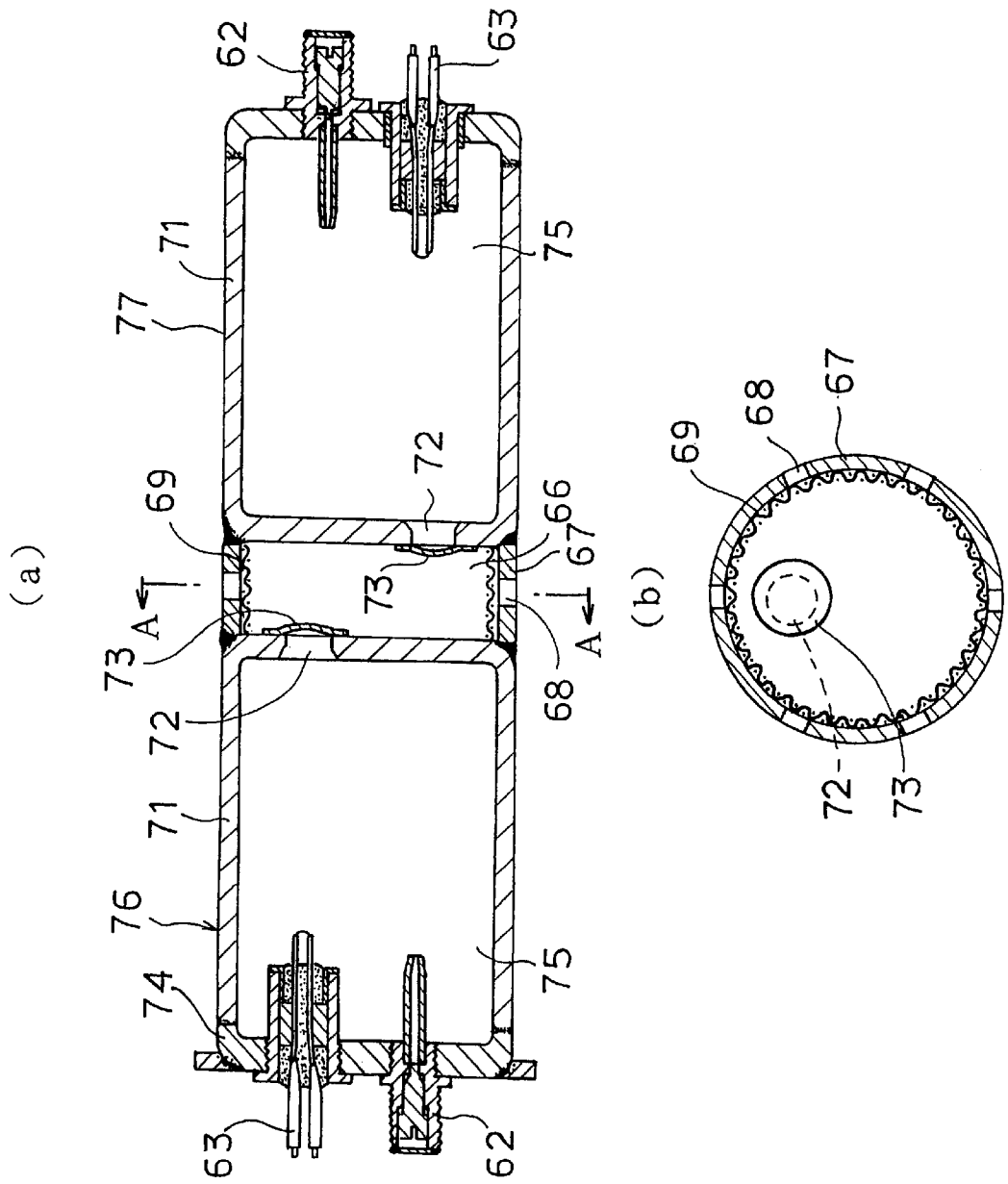
FIG. 6(a) is a sectional view of a gas generator for an air bag apparatus according to a sixth embodiment of the invention.
FIG. 6(b) is a transverse sectional view taken along the line A—A in FIG. 6(a)

FIG. 6 shows a structure of a gas generator for an air bag apparatus according to a sixth embodiment of the present invention. In FIG. 6, 76 represents first gas generating means, and 77 represents second gas generating means. A diffuser 66 is disposed between these gas generating means 76 and 77. These elements are disposed in series in the axial direction of the gas generator. In the first gas generating means 76, a bottomed cylindrical vessel member 71 is provided at its occluded bottom with a vent opening 72 and an occluding member 73 for occluding the vent opening 72 from outside. A lid member 74 is welded to an opened end of the vessel member 71, and a space in the vessel member 71 is formed as a single chamber 75. Charging means 62 and ignition means 63 are mounted to the lid member 74. The second gas generating means 77 has completely the same structure as that of the first gas generating means 76. When the second gas generating means 77 is assembled to the diffuser 66, the second gas generating means 77 is welded to the first gas generating means 76 such that the second gas generating means 77 is rotated through about 180° on the axis so that the vent openings 72 do not face each other. The diffuser 66 comprises a cylindrical member 67 having the same diameter as that of the first vessel members 71 and bottoms of the first vessel members 71. The diffuser 66 is formed with a plurality of gas injection ports 68, and a metal mesh 69 is disposed on an inner peripheral surface of the diffuser 66. A cylindrical member 67 constituting the diffuser 66 may be provided at its central portion with a mesh-like partitioning plate for preventing the occluding member 73 from shattering as in the previous embodiment.

The operation of the present embodiment will be explained next. When an acceleration detecting circuit (not shown) detects abrupt deceleration, i.e., collision or the like or the like of the vehicle, the first gas generating means 76 operates by a signal from the acceleration detecting circuit. That is, the flammable gas in the single chamber 75 is ignited and burnt by the ignition means 63, a pressure in the single chamber 75 is increased by the temperature rise due to the burning, the occluding member 73 is destroyed, the burnt gas in the single chamber 75 is dispersed in the diffuser 66 through the vent opening 72, and is introduced into the air bag from the gas injection ports 68 of the diffuser 66, thereby inflating the air bag.

The above is the operation mode when only the first gas generating means 76 is activated. In the present embodiment also, it is possible to control the injection speed of the burnt gas by simultaneously activating the first and second gas generating means 76 and 77, by activating either one of the gas generating means 76 and 77 first while deviating the timing, or by activating only one of the gas generating means 76 and 77. Further, it is possible to further vary the injection speed and injection amount of the burnt gas in the above-described operation mode by varying gas accommodating volume, gas charging pressure, gas components in each of the two gas generating means 76 and 77, and further fine control is possible.

Seventh Embodiment

Figure 7:
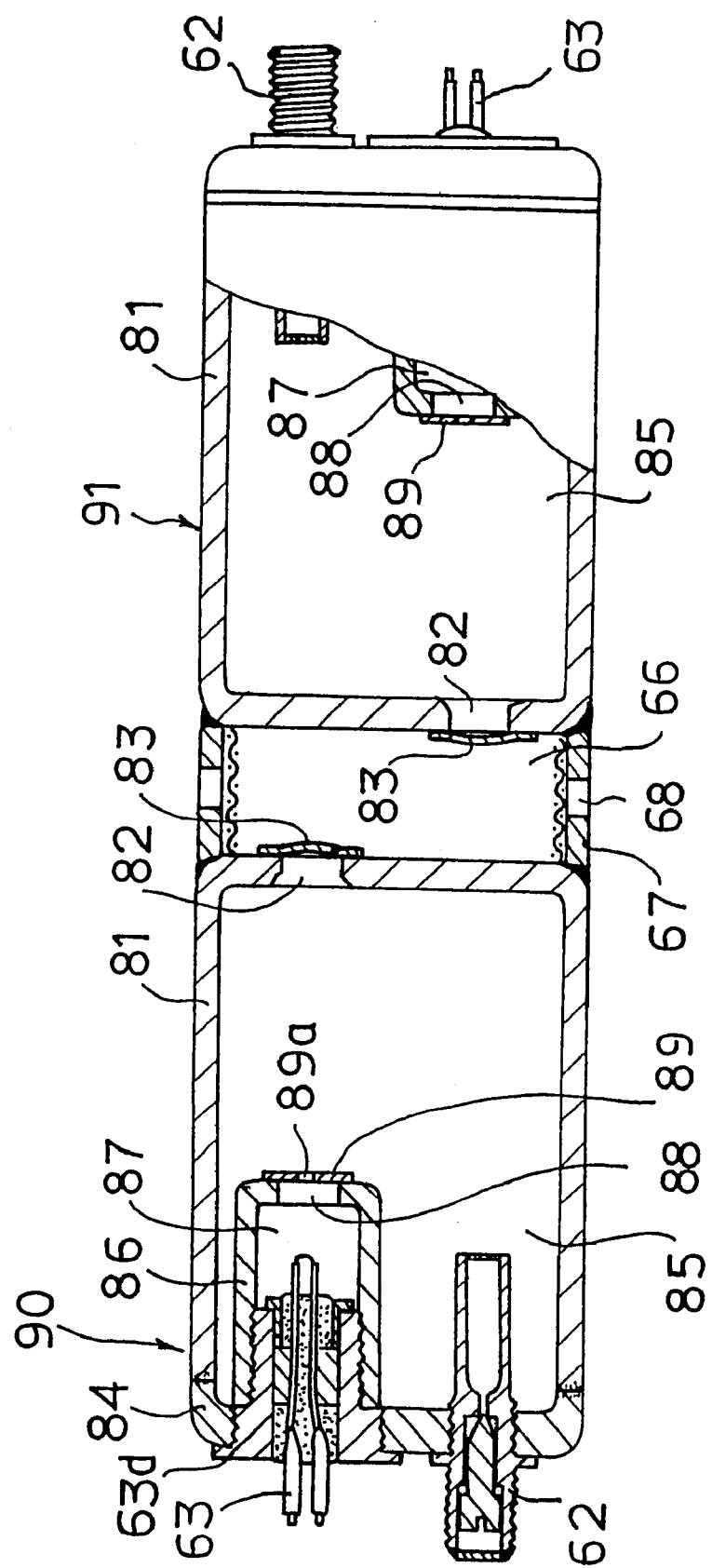
FIG. 7 is a partial sectional view of a gas generator for an air bag apparatus according to a seventh embodiment of the invention.

FIG. 7 shows a structure of a gas generator for an air bag apparatus according to a seventh embodiment of the present invention. The same elements as those in the sixth embodiment are designated by the same reference symbols. In FIG. 7, 90 represents first gas generating means, and 91 represents second gas generating means. A diffuser 66 is disposed between these gas generating means 90 and 91. These elements are disposed in series in the axial direction of the gas generator. In the first gas generating means 90, a bottomed cylindrical vessel member 81 is provided at its occluded bottom with a vent opening 82 and an occluding member 83 for occluding the vent opening 82 from outside. A lid member 84 is welded to an opened end of the vessel member 81, and a space in the vessel member 81 is formed as a single chamber 85. An opened end of a small bottomed cylindrical member 86 is fixed to a cylindrical member 63d of ignition means 63 at the side of the single chamber 85, and a space in the bottomed cylindrical member 76 is formed as an ignition preliminary chamber 87. The occluded bottom of the bottomed cylindrical member 86 is formed with an opening 88 and a sealing plate 89 having a communication hole 89 occludes the opening 88. The sealing plate 89 is a safety valve for preventing a pressure in the ignition preliminary chamber 87 from abnormally increasing, but the sealing plate 89 is not necessarily to be provided, and the communication hole 89a may directly be provided in the occluded bottom of the bottomed cylindrical member 86. The second gas generating means 91 has completely the same structure as that of the first gas generating means 90. When the second gas generating means 91 is assembled to the diffuser 66, the second gas generating means 91 is welded to the first gas generating means 90 such that the second gas generating means 91 is rotated through about 180° on the axis so that the vent openings 82 do not face each other. The cylindrical member 67 constituting the diffuser 66 may be provided at its central portion with a mesh-like partitioning plate for preventing the occluding member 83 from shattering as in the previous embodiment. After the gas generator has been assembled, component gases are sequentially charged into the single chamber 85 from the charging means 62, and the gasses are dispersed and uniformed in each of the chambers.

The operation of the present embodiment will be explained next. When an acceleration detecting circuit (not shown) detects abrupt deceleration, i.e., collision or the like of the vehicle, the first gas generating means 90 operates by a signal from the acceleration detecting circuit. That is, by the ignition means 63, the flammable gas in the ignition preliminary chamber 87 is ignited and starts burning. Since the ignition preliminary chamber 38 is small in volume, a pressure therein is immediately increased so that the burnt gas from the communication hole 89a of the sealing plate 89 ignites and burns the flammable gas in the single chamber 85. If the pressure in the single chamber 85 is increased, the occluding member 83 is destroyed, the burnt gas dispersed in the diffuser 66 through the vent opening 92, and is introduced into the air bag from the gas injection ports 68 of the diffuser 66, thereby inflating the air bag.

The above is the operation mode when only the first gas generating means 90 is activated. In the present embodiment also, as in the seventh embodiment, it is possible to control the injection speed of the burnt gas by simultaneously activating the first and second gas generating means 90 and 91, by activating either one of the gas generating means 90 and 91 first while deviating the timing, or by activating only one of the gas generating means 90 and 91. Further, it is possible to further vary the injection speed and injection amount of the burnt gas in the above-described operation mode by varying gas accommodating volume, gas charging pressure, gas components in each of the two gas generating means 90 and 91, and further fine control is possible.

Eighth Embodiment

FIGS. 8(a) and 8(b) schematically show a structure of a gas generator for an air bag apparatus according to an eighth embodiment of the present invention. In the present embodiment, the first gas generating means 76 in the sixth embodiment and the second gas generating means 91 in the seventh embodiment are connected in series with the diffuser 66 interposed therebetween, and the present eighth embodiment has the same effect as those of the sixth and seventh embodiments.

A component of the flammable gas used in each of the above-described embodiments comprises fuel gas, oxdizer gas and inert gas. As the fuel gas, hydrogen is used, but instead of hydrogen, $C_nH_{2n+1}$-based gas or $C_nH_{2n}$-based gas (n=1 to 4), or mixture gas thereof, or mixture gas with hydrogen may be used. As the oxdizer gas, oxygen is used. As the inert gas, mixture gas mainly comprising argon with helium for detecting leakage, but one of argon, helium, nitrogen and carbon dioxide, or mixture gas comprising at least two of these gases may be used. As the component of the flammable gas, one of 10 to 15 vol. % of hydrogen, 15 to 25 vol. % of oxygen, and 60 to 75 vol. % of inert gas is selected, but as a high speed burning component, 14 to 15 vol. % of hydrogen is preferable, and as a low speed burning component, 12 to 13 vol. % of hydrogen is preferable. A value in a range of 15 to 30 MPa is selected as the charging pressure. For normal burning speed, 20 to 30 MPa is preferable, and for low burning speed, 15 to 20 MPa is preferable. The charging pressure and the gas component are determined based on required inflation characteristics of the air bag, gas volume, the size of the vessel and the like. For example, in the case of a single chamber structure shown in the above-described first to sixth embodiments, gas component comprising about 14 vol. % of hydrogen, about 18 vol. % of oxygen and a balance of inert gas, and charging pressure of about 24 MPa are preferable. A relation between a volume $V_1$ of a burning chamber in the first ignition means and a volume $V_2$ of the second ignition means is selected from one of $V_1=V_2$, $V_1>V_2$ ($V_2=0.3$ to $0.8$ $V_1$), $V_1<V_2$ ($V_1=0.3$ to $0.8 V_2$).

INDUSTRIAL APPLICABILITY

As apparent from the above-described embodiment, as a first structure, a plurality of ignition means capable of separately igniting flammable gases are provided in a gas generator having one or a plurality of burning chambers which are in communication with each other, and an injection speed of burning gas is controlled by combination of ignition timings of the plurality of ignition means. As a second structure, one gas generator is divided into first gas generating means and second gas generating means, at least one ignition means is provided in each of the gas generating means, a gas accommodating volume, a charging pressure and a gas component of these two gas generating means are set equal to or different from each other, an injection amount and an injection speed and the like of the burnt gas are controlled by combination of activating timings of the two ignition means. Therefore, it is possible to realize a gas generator for an air bag apparatus capable of meeting various situations at the time of collision detected by a collision circuit.

What is claimed is:

1. A gas generator for an air bag apparatus comprising charging means which is sealed after a flammable fluid is charged, a first bottomed cylindrical vessel having an open end to which a first lid member is welded, a second bottomed cylindrical vessel welded to the first lid member to form a first chamber filled with said charged flammable fluid and having a first vent opening occluded by a first occluding member formed in said lid member, a second chamber filled with said flammable fluid and having a volume greater than that of said first chamber and having a second vent opening occluded by a second occluding member which is capable of being in communication with said first chamber, at least one communication hole formed in a portion of a wall forming said first chamber and bringing said first and second chambers into communication with each other, first ignition means for igniting said flammable fluid in said first chamber, second ignition means for igniting said flammable fluid in said second chamber, and a diffuser which can be in communication with said first chamber through said first vent opening.

2. A gas generator for an air bag apparatus according to claim 1, further comprising an ignition preliminary chamber formed such as to surround said second ignition means and having at least one communication hole which is in communication with said second chamber.

3. A gas generator for an air bag apparatus according to claim 1, wherein said flammable fluid includes fuel gas, oxidizer gas and inert gas.

4. A gas generator for an air bag apparatus according to claim 1, wherein only one of said ignition means is allowed to ignite.

5. A gas generator for an air bag apparatus according to claim 1, wherein ignition timings of said two ignition means are different from each other.

6. A gas generator for an air bag apparatus according to claim 1, wherein ignition timing of said two ignition means are the same.

7. An inflating method, comprising inflating an air bag using the gas generator described in claim 1.

8. A gas generator for an air bag apparatus according to claim 1, wherein said second vent opening is formed in said second bottomed cylindrical vessel.

9. A gas generator for an air bag apparatus according to claim 1, wherein one end of the first ignition means is secured in the first lid member and the other end of the ignition means is secured by a second lid member, the first and second lid members forming respective ends of the diffuser.

* * * * *